United States Patent [19]

Aspa

[11] 4,314,973
[45] Feb. 9, 1982

[54] INSTALLATION FOR ALKALINIZING AND PASTEURIZING COCOA BEANS BEFORE THEY ARE CRUSHED

[75] Inventor: André J. Aspa, Hardricourt, France

[73] Assignee: Commodities Trading & Development Ltd., Lausane, Switzerland

[21] Appl. No.: 135,346

[22] Filed: Mar. 31, 1980

[30] Foreign Application Priority Data

Apr. 3, 1979 [FR] France ............... 79 08356

[51] Int. Cl.³ ................................. B01J 8/10
[52] U.S. Cl. ........................... 422/209; 99/483
[58] Field of Search ........... 426/521, 465; 422/209, 422/210, 189; 34/129, 130, 132, 136; 99/470, 477, 483; 209/482, 473, 452

[56] References Cited

U.S. PATENT DOCUMENTS

| | | | |
|---|---|---|---|
| 597,082 | 1/1898 | Kuhn | 426/521 |
| 2,323,289 | 7/1943 | Anderson et al. | 34/129 |
| 2,460,008 | 1/1949 | Heller | 34/136 |
| 2,708,654 | 5/1955 | Lykken | 34/129 |
| 2,838,489 | 6/1958 | Mitchell | 422/209 |
| 2,924,513 | 2/1960 | Altimier et al. | 422/209 |
| 3,519,815 | 7/1970 | Sandbrook | 422/209 |
| 4,010,550 | 3/1977 | Freze | 34/129 |

*Primary Examiner*—Hiram Bernstein
*Attorney, Agent, or Firm*—Schiller & Pandiscio

[57] ABSTRACT

The disclosed apparatus comprises a first rotary drum exposed to the atmosphere and means for continuously and conjointly feeding cocoa beans and an alkaline solution into the first drum. Means are provided for heating the contents of the first drum so that (1) the alkaline solution reacts very slowly on the beans and (2) the beans reach the outlet of the first drum in a partially dried condition. The apparatus also includes means for continuously feeding the beans leaving the first drum into a second rotary drum also exposed to the atmosphere and means for providing a stream of hot air in the direction of movement of the beans so as (1) to destroy the microbial fauna and (2) to dry the beans. Means are also provided for recovering the dry beans at the outlet of the second drum.

9 Claims, 6 Drawing Figures

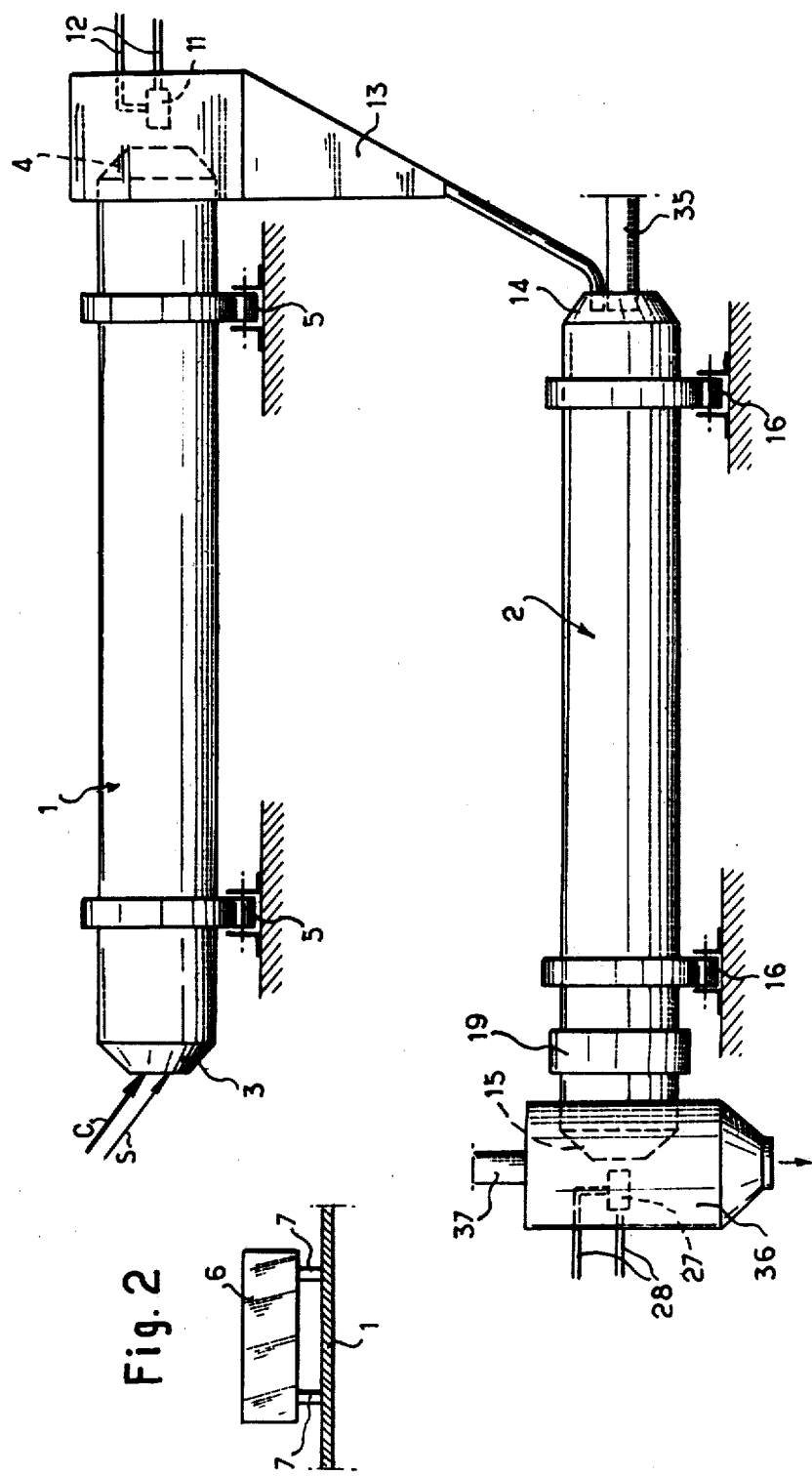

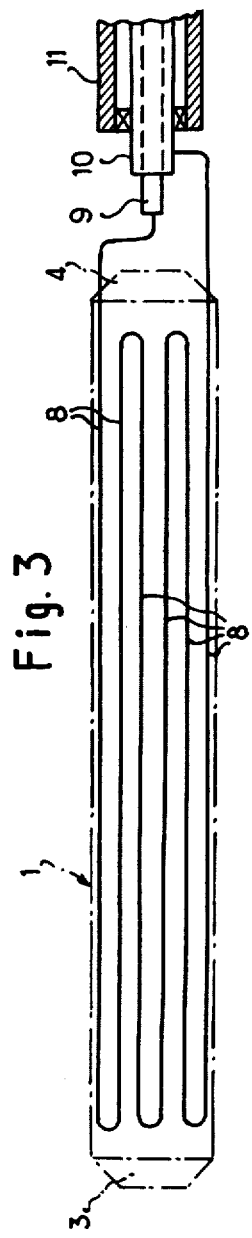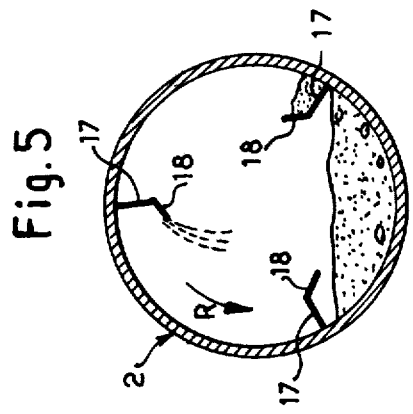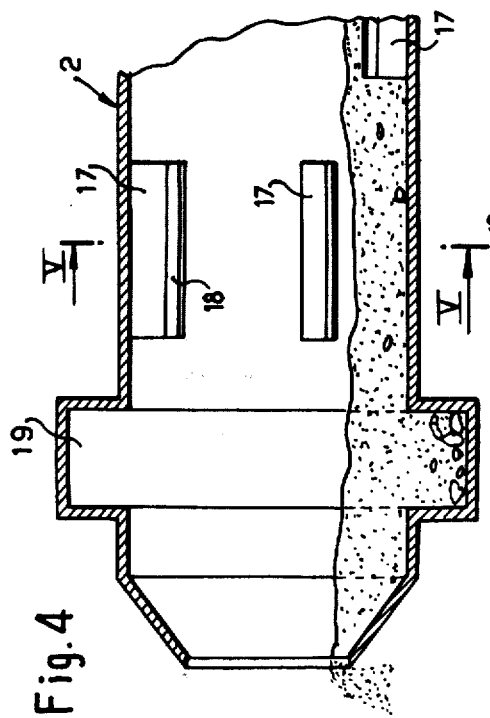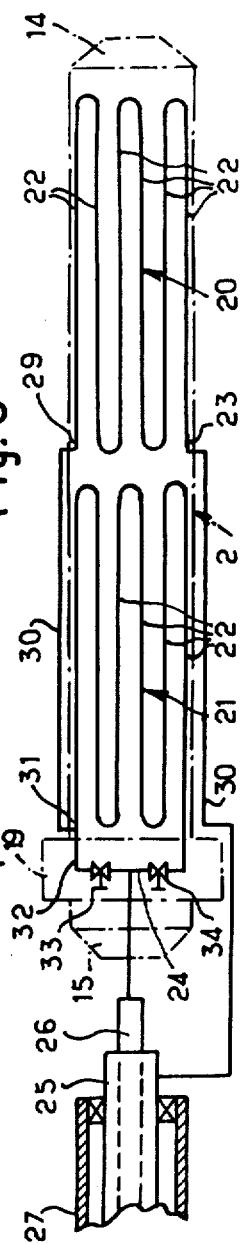

INSTALLATION FOR ALKALINIZING AND PASTEURIZING COCOA BEANS BEFORE THEY ARE CRUSHED

The present invention relates to a process of and an installation for alkalinizing and pasteurizing cocoa beans before they are ground.

The alkalinization and pasteurization of cocoa beans are two essential steps in the manufacture of cocoa. The first develops in effect the aroma of the cocoa and improves its taste while giving it a pleasant color. As for the second, it ensures destruction of the microbial fauna present in the beans.

At the present time, these two steps are practically always carried out in a discontinuous fashion. Now, it is evident that the yield of the cocoa producing units is penalized thereby. To increase the capacity of these units, some constructors have endeavoured, it is true, to perfect installations in which the alkalinization and pasteurization are carried out continuously. These installations use however complicated processes which make their use difficult and costly.

The present invention proposes remedying the drawbacks mentioned above. The alkalinization and pasteurization process of the present invention comprises the steps of continuously and conjointly introducing the beans and an alkaline treatment solution into a first rotary drum communicating with the atmosphere, heating the contents of the first drum so that the alkaline solution reacts on the beans and the beans reach the outlet of the first drum in a partially dried condition, introducing the beans leaving the first drum into a second rotary drum also communicating with the atmosphere, providing a stream of very hot air in the direction of movement of the beans in the second drum so as to destroy the microbial fauna and so as to dry the beans and recovering the dried beans at the outlet of the second drum.

With this process, the alkalinization and pasteurization steps may now be effected simply and economically, mainly because the rotary drums do not need to be pressurized as is the case in recently proposed processes.

Emphasis should moreover be laid on the importance of the choice of the direction in which the hot air flows inside the second drum. By flowing in the direction of movement of the beans, the hot air in fact contacts the beans when they are still humid and, by being progressively exposed to humidity the beans cool down so that there is no risk of burning them during pasteurization. For this reason, a large amount of volatile aromas remains in the beans, which allows the cocoa to keep all its aroma.

According to a preferred embodiment of the invention, the beans and the alkaline solution are continuously introduced into the first drum in practically equal proportions by weight, the alkaline solution containing 1 to 3.5% by weight of carbonate.

It is moreover advantageous for the contents of the first drum to be heated by the wall thereof. With this arrangement, the installation of cumbersome heating apparatus inside the drum or the setting up of a complicated ventilation heating system are in effect avoided.

In accordance with a particular feature of the process of the invention, the beans are maintained in the first drum for about 4 hours wherein they are brought to a temperature of about 60° C. and their humidity at the outlet of this drum is brought down to about 30%. It will be readily understood that the long time spent by the beans inside the first drum allows alkalinization to be carried out in depth and thus to affect all the internal parts of the beans.

It will moreover be noted that the choice of the alkalinization temperature has been determined, on the one hand to allow the alkaline solution to react with the beans in the best conditions and, on the other hand, to lower the humidity of the beans to a percentage at which the subsequent pasteurization can be carried out with all the required efficiency.

According to another feature of the process of the invention, the hot air stream is fed into the second drum at a temperature of about 300° C. and leaves at a temperature at most equal to 120° C.

The values given to the input and output temperatures of the hot air stream comply with very precise technical requirements. The hot air must in fact enter the second drum at a temperature at which it may provide both instantaneous pasteurization and total drying of the beans, and this without risk of burning them. It must moreover leave at a temperature below which it does not risk causing cocoa butter to be extruded from the dry beans.

Preferably, the beans are maintained in the second drum for about 3 hours and leave at about 90° C., their humidity being then lowered to below 2%.

For the drying operations to take place under the best conditions, it is moreover advantageous for the beans to reach their output temperature after undergoing complementary heating by the internal wall of the second drum.

The present invention also relates to apparatus for implementing the process described above. The apparatus comprises a first rotary drum communicating with the atmosphere, means provided at the inlet of the first drum for continuously and conjointly feeding the beans and an alkaline solution into the first drum, heating means associated with the first drum for promoting the reaction of the alkaline solution on the beans and for bringing the beans to a partially dried condition, a second rotary drum also communicating with the atmosphere, means for continuously transferring the beans leaving the first drum into the second, means for providing in said second drum a stream of hot air whose input temperature is about 300° C. in the direction of movement of the beans, heating means associated with the second drum and cooperating with the hot air stream for bringing the beans to an output temperature of about 90° C. and for lowering their humidity to below 2%, and means for recovering the dried beans leaving the second drum.

Preferably, the two rotary drums each have a tubular body of constant section and an inlet and outlet each of which terminates in a converging part in the form of a truncated cone.

Owing to these truncated cone shaped parts, the capacity of the drums is considerably increased since the beans may thus form a relatively thick layer therein.

According to a particular embodiment, the second drum comprises an annular internal groove situated slightly upstream of its truncated cone shaped part.

It frequently happens that stones are present in the beans. Now, since they are heavier than the beans, they accumulate by gravity at the bottom of the annular groove in which they are kept with a view to their subsequent recovery.

Advantageously, the two drums comprise internal blades disposed parallel to their longitudinal axis and regularly staggered angularly and longitudinally in relation to each other, the blades of the first drum resting on supports maintaining them spaced apart from the wall thereof.

The stirring of the beans caused by the rotation of the two drums is obviously intensified by the presence of the blades. The alkaline solution and the hot air stream may then act uniformly on all the beans.

Because of their particular distribution, the blades facilitate moreover the forward movement of the beans inside the drums. Furthermore, because of the space provided between the blades of the first drum and the wall thereof, the beans, in particular those which are very humid, may neither settle nor accumulate at the base of these blades. In fact, if a deposit were to form, it would be immediately carried away by the beans passing through the free space provided between the wall of the drum and the corresponding blades. In addition, the partial sliding of the humid beans on the wall of the cylinder produces a self-cleaning effect of the wall, indispensable to the continuous operation of the installation.

Preferably, the blades of the second drum are provided with a bent part along their longitudinal side opposite the wall of said drum, this bent part being turned in the direction of rotation thereof. Because of their bent part, the blades take up the beans which they meet at the lower part of the drum and bring them substantially to the upper part thereof.

During further rotation of the drum, there comes however a moment when the beans are no longer retained by the bent parts of the blades and then fall back in a shower to the lower part of the drum. Now, during their fall, they pass through the hot air stream which, because of their state of fluidization, may exert thereon more rapid and more efficient drying and pasteurization.

According to a particular embodiment of the invention, the heating means associated with the first drum are formed by at least one group of longitudinal channels mounted in series on the external face of the wall of said first drum. The inlet and the outlet of this group are connected to a fluid circuit, through which flows a heat-carrying fluid. The fluid circuit includes two concentric chambers formed in a rotary seal adjacent the outlet of the first drum.

In this embodiment, the heating means associated with the second drum are formed by at least one assembly of two groups of longitudinal channels mounted in series on the external face of the wall of said second drum. The two groups of this assembly are mounted in series and disposed respectively upstream and downstream of the median part of the second drum. The inlet of the upstream group and the outlet of the downstream group are connected to a fluid circuit through which flows a heat-carrying fluid. This fluid circuit includes two concentric chambers formed in a rotary seal adjacent the outlet of the second drum.

Since cocoa beans burn at about 170° C., the temperature of the heat-carrying fluid at the inlet of the upstream group of channels of the second drum will have to be at most 200° C. so that the losses by radiation are sufficient to bring it to below 170° C. at the inlet of the downstream group of channels of the second drum.

Preferably, the inlet and the outlet of the upstream group of channels of the second drum are disposed substantially in the transverse median plane of the second drum and are connected by outer connecting channels, the inlet to the rotary seal and the outlet to the inlet of the downstream group of channels.

As for the inlet and outlet of the downstream group, they are adjacent the outlet of the second drum.

According to another feature of the invention, by-pass piping is provided between the inlet and the outlet of the downstream group. The valves are inserted, one in the by-pass piping and the other in the downstream group.

Thus, by opening the by-pass piping and by closing the other valve, it is possible to short-circuit the downstream group, particularly if its use carries the risk of bringing the beans to a temperature higher than their combustion temperature.

The above and other objects, features and advantages of the present invention will become apparent from the following description, given solely by way of non limiting illustration, when taken in conjunction with the accompanying drawings.

FIG. 1 is a schematical front view of the installation of the invention.

FIG. 2 is a front view of a blade provided inside the first rotary drum of the installation.

FIG. 3 shows schematically the heating fluid circuit of the first drum.

FIG. 4 is an enlarged sectional view of the outlet of the second rotary drum of the installation.

FIG. 5 is a sectional view along line V—V of FIG. 4.

FIG. 6 shows schematically the heating fluid circuit of the second drum.

The installation which can be seen in FIG. 1 forms part of a cocoa producing unit in which it is situated downstream of a station for hulling the cocoa beans and upstream of a crushing station. It comprises essentially a first rotary drum 1 communicating with the atmosphere, this first drum being used for alkalinizing the hulled beans and a second rotary drum 2 also communicating with the atmosphere, the alkalinized beans leaving the first drum being fed into the second drum for pasteurization and thorough drying therein.

Drum 1 is formed from a long cylinder whose inlet 3 and outlet 4 each terminate in a converging part in the form of a truncated cone. Drum 1 rests in a conventional way on rollers 5 so that the drum can be rotated about its longitudinal axis which slopes slightly downwards from its inlet.

On the internal face of its wall, drum 1 comprises blades such as the one shown at 6 in FIG. 2. These blades which are disposed parallel to the longitudinal axis of the drum and regularly staggered longitudinally and angularly in relation to each other, each rests on two supports 7 so as to be spaced from the wall of the drum, as can be clearly seen in FIG. 2.

Drum 1 is furthermore provided with heating means disposed between its wall and an outer heat-insulating coating. In the embodiment envisaged here, these heating means are formed by longitudinal channels spaced out uniformly along the external face of the wall of the drum and grouped in three groups mounted in parallel and identical to the one shown schematically in FIG. 3. Referring to this FIG. 3, it can be seen that each group comprises several adjacent channels 8 mounted in series and is connected through two concentric chambers 9 and 10 formed in a rotary seal 11 adjacent the outlet of drum 1, to a heating fluid circuit 12 (see FIG. 1)

through which flows a heat-carrying fluid, for example oil, heated to about 60° C.

The hulled beans C are continuously fed into the inlet 3 of drum 1, conjointly with an alkaline solution S. So that the alkalinization takes place under the proper conditions, it is desirable for the amounts of beans and of aqueous solution fed into the drum to be practically equal.

During operation of the installation, the beans are regularly stirred by the blades 6, which allows them to be intimately mixed with solution S and to advance more readily in the direction of outlet 4. It will here be noted that beans cannot collect at the base of blades 6. In fact, since these latter are at a distance from the wall of the drum, the beans passing through the free intermediate space prevent the formation of a deposit thereon.

As has already been pointed out, the wall of the drum is heated by oil flowing in the longitudinal channels 8. Now, because of this heating, the alkaline solution reacts more actively on the beans. Its action has furthermore the time to be exerted in depth since the beans remain in the drum for about 4 hours.

For the sake of completeness, it should also be noted that by contacting the wall of the drum, the beans are progressively heated to about 60° C. and thus undergo a first drying during which their humidity at outlet 4 is brought down to about 30%.

When leaving the first rotary drum, the alkalinized beans then fall into a chute 13 which continuously transfers them to the second rotary drum 2 which will now be described.

As can be seen in FIG. 1, this second drum is formed from a long cylinder whose inlet 14 and outlet 15 each terminate in a converging part in the form of a truncated cone. Like the first drum, it rests on rollers 16 so that the drum can be rotated about its longitudinal axis, the latter sloping slightly downwards from its inlet.

The internal face of the wall of drum 2 carries blades 17 for stirring the beans, for promoting their advance towards outlet 15, as well as for intensifying the action which is exerted on them by the hot air stream which will be discussed hereafter. These blades are disposed parallel to the longitudinal axis of the drum and are regularly staggered angularly and longitudinally in relation to each other. Referring in particular to FIG. 5, it will be noticed furthermore that they are provided with a bent part 18 along their longitudinal side opposite the wall of the drum. Since their bent part is rotated in the direction of rotation of the drum defined by arrow R they convey with them beans which, when they arrive at the upper part of the drum, fall back in a shower.

Referring in particular to FIG. 4, it can moreover be seen that drum 2 comprises an internal annular groove 19 situated slightly upstream of its outlet 15 so that any stones can be separated from the beans. Since the stones are in fact heavier than the beans, they fall to the bottom of this groove which retains them.

Just like drum 1, the second drum comprises heating means disposed between its wall and an outer heat-insulating coating. These heating means are formed by three identical assemblies each comprising two groups 20 and 21 mounted in series and formed from longitudinal channels 22 uniformly spread out around the external face of the wall of the drum, channels 22 of the same group being also mounted in series. As can be seen in FIG. 6 which represents schematically one of the three assemblies of groups, groups 20 and 21 are disposed respectively downstream and upstream of the median part of the drum.

In the example illustrated here, the inlet 23 of group 20 and the outlet 24 of group 21 are connected, through two concentric chambers 25 and 26 formed in a rotary seal 27 adjacent the outlet 15 of the drum, to a heating fluid circuit 28 (shown in FIG. 1) through which flows a heat-carrying fluid, for example oil, heated to about 200° C. In this example, the inlet 23 and the outlet 29 of group 20 are situated substantially in the transverse median plane of the drum. Inlet 23 and outlet 29 are connected by outer connecting channels 30, the first to chamber 25 and the second to inlet 31 of group 20. By-pass piping 32 is moreover provided between inlet 31 and outlet 24 of group 21, this piping comprising a valve 33 which, in cooperation with a second valve 34 inserted in group 21, may possibly be used for short-circuiting this latter.

It should be noted here that the temperature of the oil flowing in group 21 must be less than 170° C. to prevent the cocoa beans from burning when they leave the drum.

Referring again to FIG. 1, the presence of a conduit 35 will be noticed emerging at the inlet 14 of the drum. This conduit is in fact provided for feeding into the drum, in the direction of movement of the beans, a hot air stream so that the beans exposed to the hot air stream reach the outlet 15 of the drum pasteurized and dried. By way of indication, it will be recalled that the input temperature of the hot air is about 300° whereas its output temperature must be less than 120° C. to avoid extrusion of the cocoa butter.

For the sake of completeness, it will finally be noted that after leaving the drum the dried and pasteurized beans fall into a hopper 36 from which they are directed to the crushing station the hot air is discharged through a circuit 37 into an economizer. The new air reheated by the used air being fed into conduit 35.

It is apparent that within the scope of the invention, modifications and different arrangements can be made other than are here disclosed. The present disclosure is merely illustrative with the invention comprehending all variations thereof.

I claim:

1. Apparatus for alkalinizing and pasteurizing cocoa beans before they are crushed, said apparatus comprising a first drum communicating with the atmosphere and including an inlet and an outlet, said first drum being rotatable about its longitudinal axis so as to transport beans from said inlet to said outlet;

means provided at the inlet of the first drum for conjointly and continuously feeding the beans and an alkaline solution into the first drum;

heating means for heating the first drum so as to promote the reaction of the alkaline solution on the beans and for bringing said beans to a partially dried condition;

a second drum communicating with the atmosphere and including an inlet and outlet, said second drum being rotatable about its longitudinal axis so as to transport beans from the inlet of said second drum to the outlet of said second drum;

means for continuously transferring the beans leaving the outlet of the first drum through the inlet of the second drum into the second drum;

means for providing a stream of hot air whose input temperature is about 300° C. through said second drum in the direction of movement of said beans;

heating means for heating the second drum and cooperating with the hot air stream to bring the beans exiting the outlet of the second drum to an output temperature of about 90° C. and for lowering the humidity of said beans to below 2%; and means for recovering the dried beans leaving the outlet of the second drum;

wherein said first and second drums each comprises a plurality of internal blades each disposed parallel to the longitudinal axis of the respective drum and regularly staggered angularly and longitudinally in relation to each other, and said first drum further includes support means for supporting each of the blades of the first drum in a spaced relationship with the internal wall of said first drum.

2. Apparatus as claimed in claim 1, wherein the two rotary drums each have a tubular body of constant cross-section and the inlet and outlet of each said body each terminates in a converging part in the form of a truncated cone.

3. Apparatus as claimed in claim 2, wherein the second drum comprises an internal annular groove disposed upstream of the outlet of said second drum.

4. Apparatus as claimed in claim 1, wherein the blades of the second drum are each provided with a bent part along the longitudinal side of the blade opposite the wall of said second drum, said bent part being turned in the direction of rotation of said second drum.

5. Apparatus as claimed in claim 1, wherein the heating means for heating the first drum includes a first plurality of longitudinal channels interconnected in series and mounted on the external face of the wall of said first drum, an inlet to said first plurality of channels and an outlet to said first plurality of channels, the inlet and the outlet of said first plurality are connected to a circuit for providing a heated fluid, through said first plurality, said circuit including two concentric chambers formed in a rotary seal adjacent the outlet of the first drum.

6. Apparatus as claimed in claim 1, wherein the heating means for heating the first drum includes at least one assembly of first and second pluralities of longitudinal channels, each said plurality of channels being interconnected in series and mounted on the external face of the wall of said second drum, the first and second pluralities of said assembly being interconnected in series and disposed respectively upstream and downstream of the median part of the second drum, the inlet of the upstream plurality and the outlet of the downstream plurality being connected to a circuit for providing a heated fluid, through said first and second pluralities of channels, said circuit including two concentric chambers formed in a rotary seal adjacent to the outlet of the second drum.

7. Apparatus as claimed in claim 6, wherein the inlet and outlet of the upstream plurality of channels are disposed substantially in the transverse median plane of the second drum and are connected by outer connection channels, the first of said outer connection channels being connected to the rotary seal and the second of said outer connection channels being connected to the inlet of the downstream plurality.

8. Apparatus as claimed in claim 7, wherein the inlet and the outlet of the downstream plurality are adjacent the outlet of the second drum.

9. Apparatus as claimed in claim 8, further including by-pass piping provided between the inlet and the outlet of the downstream plurality, and a pair of valves, one of said valves being coupled in the by-pass piping and the other of said valves being coupled in the downstream plurality of channels.

* * * * *